United States Patent
Xu et al.

(10) Patent No.: US 11,394,957 B2
(45) Date of Patent: Jul. 19, 2022

(54) CONSTRAINTS ON REFERENCE SAMPLE LOCATIONS IN THE DEDICATED BUFFER FOR INTRA PICTURE BLOCK COMPENSATION

(71) Applicant: TENCENT AMERICA LLC, Palo Alto, CA (US)

(72) Inventors: Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/027,137

(22) Filed: Sep. 21, 2020

(65) Prior Publication Data

US 2021/0112243 A1   Apr. 15, 2021

Related U.S. Application Data

(60) Provisional application No. 62/904,435, filed on Sep. 23, 2019.

(51) Int. Cl.
*H04N 19/105*   (2014.01)
*H04N 19/176*   (2014.01)
*H04N 19/96*    (2014.01)
*H04N 19/196*   (2014.01)
*H04N 19/159*   (2014.01)

(52) U.S. Cl.
CPC ......... *H04N 19/105* (2014.11); *H04N 19/159* (2014.11); *H04N 19/176* (2014.11); *H04N 19/196* (2014.11); *H04N 19/96* (2014.11)

(58) Field of Classification Search
CPC ....... G01B 11/2408; A61F 2009/00855; A61F 9/008
USPC .................................................... 375/240.03
See application file for complete search history.

(56) References Cited

U.S. PATENT DOCUMENTS

| | | | |
|---|---|---|---|
| 2015/0296213 A1* | 10/2015 | Hellman | H04N 19/433 375/240.01 |
| 2016/0100163 A1* | 4/2016 | Rapaka | H04N 19/182 375/240.16 |
| 2017/0127090 A1* | 5/2017 | Rosewarne | H04N 19/86 |
| 2020/0021839 A1* | 1/2020 | Pham Van | H04N 19/52 |
| 2020/0112717 A1* | 4/2020 | Pham Van | H04N 19/105 |
| 2020/0204819 A1* | 6/2020 | Hsieh | H04N 19/105 |

OTHER PUBLICATIONS

Shan Liu et al., "Overview of HEVC extensions on screen content coding", SIP, 2015, pp. 1-12, vol. 4.

(Continued)

*Primary Examiner* — Kaitlin A Retallick
(74) *Attorney, Agent, or Firm* — Sughrue Mion, PLLC

(57) ABSTRACT

A method for setting a block vector for intra block copy (IBC) may include setting the block vector that indicates an offset between a current block in a current picture and a reference block in the current picture to satisfy a constraint that locations of reference samples of the reference block stored in an IBC buffer do not correspond to both of a first horizontal edge of the IBC buffer and a second horizontal edge of the IBC buffer; and performing IBC based on setting the block vector to satisfy the constraint.

17 Claims, 7 Drawing Sheets

(56) References Cited

OTHER PUBLICATIONS

Jizheng Xu et al., "Bitstream conformance with a virtual IBC buffer concept", Joint Video Experts Team (JVET) of ITU-T SG 16 WP 3 and ISO/IEC JTC 1/SC 29/WG 11, JVET-O1170-v1, Jul. 3-12, 2019, 8 pages.

Xiaozhong Xu et al., "CE8-related: Unified intra block copy block vector prediction", Joint Video Experts Team (JVET) of ITU-T SG 16 WP 3 and ISO/IEC JTC 1/SC 29/WG 11, JVET-N0382-v2, Mar. 19-27, 2019, 11 pages.

Benjamin Bross et al., "Versatile Video Coding (Draft 3)", Joint Video Experts Team (JVET) of ITU-T SG 16 WP 3 and ISO/IEC JTC 1/SC 29/WG 11, JVET-L1001-v7, Oct. 3-12, 2018, 226 pages.

Xiaozhong Xu et al., "CE8-related: CPR mode with local search range optimization", vJoint Video Experts Team (JVET) of ITU-T SG 16 WP 3 and ISO/IEC JTC 1/SC 29/WG 11, JVET-L0297-v1, Oct. 3-12, 2018, 6 pages.

Xiaozhong Xu et al., "CE8: CPR mode with local search ranges (Test CE8.3.1 and CE8.3.2)", Joint Video Experts Team (JVET) of ITU-T SG 16 WP 3 and ISO/IEC JTC 1/SC 29/WG 11, JVET-L0293-v2, Oct. 3-12, 2018, pages.

Jicheng An et al., "Quadtree plus binary tree structure integration with JEM tools", Joint Video Exploration Team (JVET) of ITU-T SG 16 WP 3 and ISO/IEC JTC 1/SC 29/WG 11, JVET-B0023, Feb. 20-26, 2016, 10 pages.

Rajan Joshi et ak., "High Efficiency Video Coding (HEVC) Screen Content Coding: Draft 6", Joint Collaborative Team on Video Coding (JCT-VC) of ITU-T SG 16 WP 3 and ISO/IEC JTC 1/SC 29/WG 11, JCTVC-W1005-v4, Feb. 19-26, 2016, 685 pages.

Xiaozhong Xu et al., "Intra Block Copy in HEVC Screen Content Coding Extensions", IEEE Journal on Emerging and Selected Topics in Circuits and Systems, 11 pages, Aug. 19, 2016.

\* cited by examiner

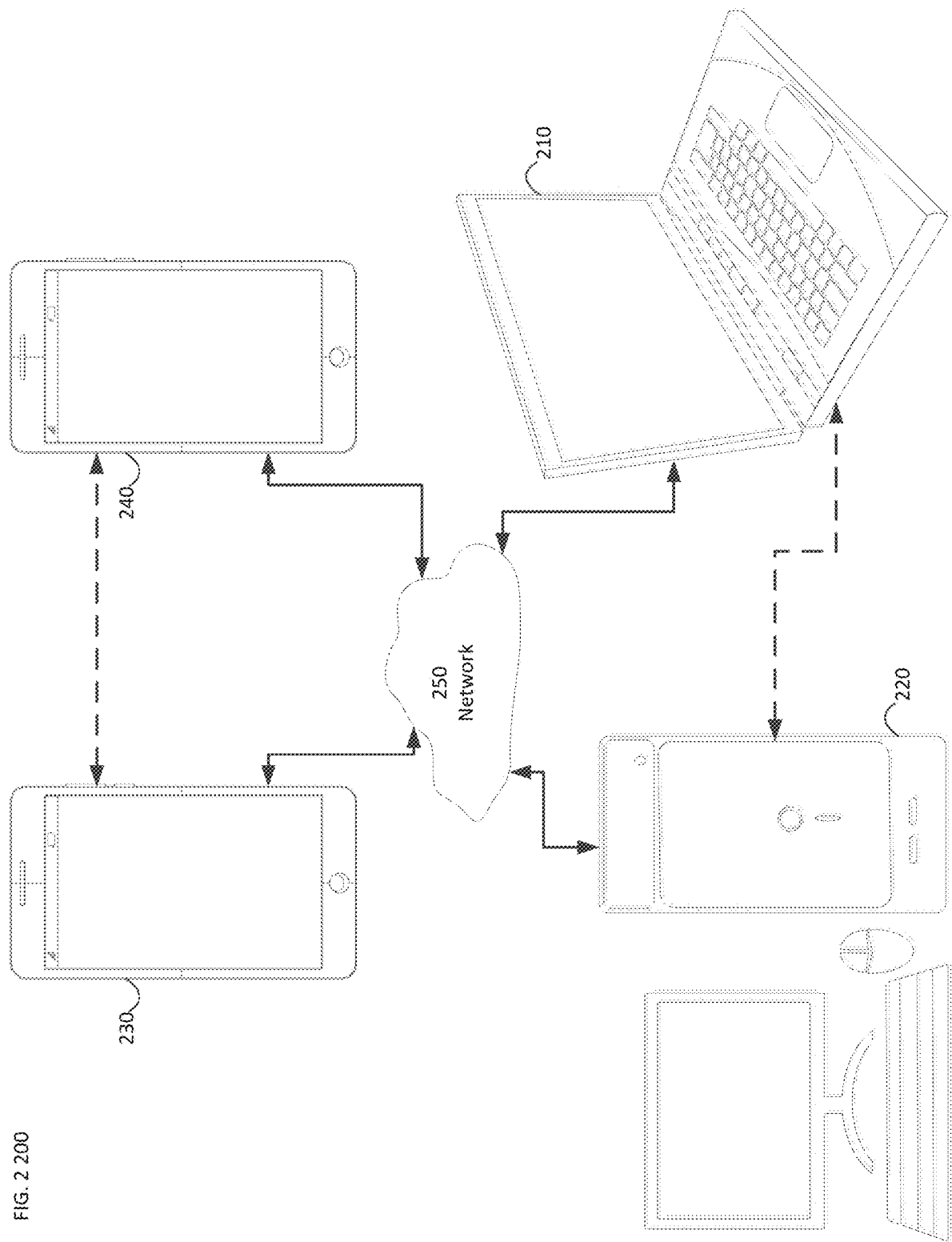

Computer System 600

CONSTRAINTS ON REFERENCE SAMPLE LOCATIONS IN THE DEDICATED BUFFER FOR INTRA PICTURE BLOCK COMPENSATION

CROSS-REFERENCE TO RELATED APPLICATION

This application claims priority under 35 U.S.C. § 119 to U.S. Application No. 62/904,435, filed on Sep. 23, 2019, in the United States Patent & Trademark Office, the disclosure of which is incorporated herein by reference in its entirety.

FIELD

The present disclosure is directed to setting a block vector to satisfy constrains on reference sample locations in a dedicated buffer for intra picture block compensation.

BACKGROUND

Block based compensation from a different picture is known as motion compensation. Similarly, block compensation may also be performed using a previously reconstructed area within the same picture, which is referred to as "intra picture block compensation," "current picture referencing (CPR)", or "intra block copy (IBC)."

A displacement vector that indicates the offset between the current block and the reference block is referred as the "block vector." In contrast to a motion vector in motion compensation, which can be at any value (e.g., positive or negative in either the x or y directions), a block vector has a few constraints such that it is ensured that the pointed reference block is available and already reconstructed. Also, for parallel processing considerations, a reference area that is a tile boundary or a wavefront ladder shape boundary is also excluded.

The coding of a block vector may be either explicit or implicit. In the explicit mode (e.g., referred to as "advanced motion vector prediction (AMVP) mode" in inter coding), the difference between a block vector and its predictor is signaled. In the implicit mode, the block vector is recovered purely from its predictor, in a similar way as a motion vector in merge mode. The resolution of a block vector, in some implementations, is restricted to integer positions; in other systems, it may be allowed to point to fractional positions.

The use of intra block copy at the block level may be signaled using a block level flag, which may be referred to as an "IBC flag." In High Efficiency Video Coding (HEVC) Screen Content Coding (SCC), a reference picture is set in the last position of the list. This special reference picture is also managed together with other temporal reference pictures in the Decoded Picture Buffer (DPB).

There are also some variations for intra block copy, such as flipped intra block copy (e.g., the reference block is flipped horizontally or vertically before being used to predict a current block), or line based intra block copy (e.g., each compensation unit inside an MN coding block is an M×1 or 1×N line).

SUMMARY

According to an aspect of the disclosure, a method for setting a block vector for intra block copy (IBC) may include setting the block vector that indicates an offset between a current block in a current picture and a reference block in the current picture to satisfy a constraint that locations of reference samples of the reference block stored in an IBC buffer do not correspond to both of a first horizontal edge of the IBC buffer and a second horizontal edge of the IBC buffer; and performing IBC based on setting the block vector to satisfy the constraint.

According to an aspect of the disclosure, a device for setting a block vector for intra block copy (IBC) may include at least one memory configured to store program code; and at least one processor configured to read the program code and operate as instructed by the program code, the program code may include setting code configured to cause the at least one processor to set the block vector that indicates an offset between a current block in a current picture and a reference block in the current picture to satisfy a constraint that locations of reference samples of the reference block stored in an IBC buffer do not correspond to both of a first horizontal edge of the IBC buffer and a second horizontal edge of the IBC buffer; and performing code configured to cause the at least one processor to perform IBC based on setting the block vector to satisfy the constraint.

According to an aspect of the disclosure, a non-transitory computer-readable medium may store instructions that, when executed by one or more processors of a device, cause the one or more processors to set the block vector that indicates an offset between a current block in a current picture and a reference block in the current picture to satisfy a constraint that locations of reference samples of the reference block stored in an IBC buffer do not correspond to both of a first horizontal edge of the IBC buffer and a second horizontal edge of the IBC buffer; and perform IBC based on setting the block vector to satisfy the constraint.

BRIEF OF DESCRIPTION OF THE DRAWINGS

Further features, the nature, and various advantages of the disclosed subject matter will be more apparent from the following detailed description and the accompanying drawings in which:

FIG. 2 is a diagram of a communication system according to an embodiment of the present disclosure;

DETAILED DESCRIPTION

Figures 1A, 1B:
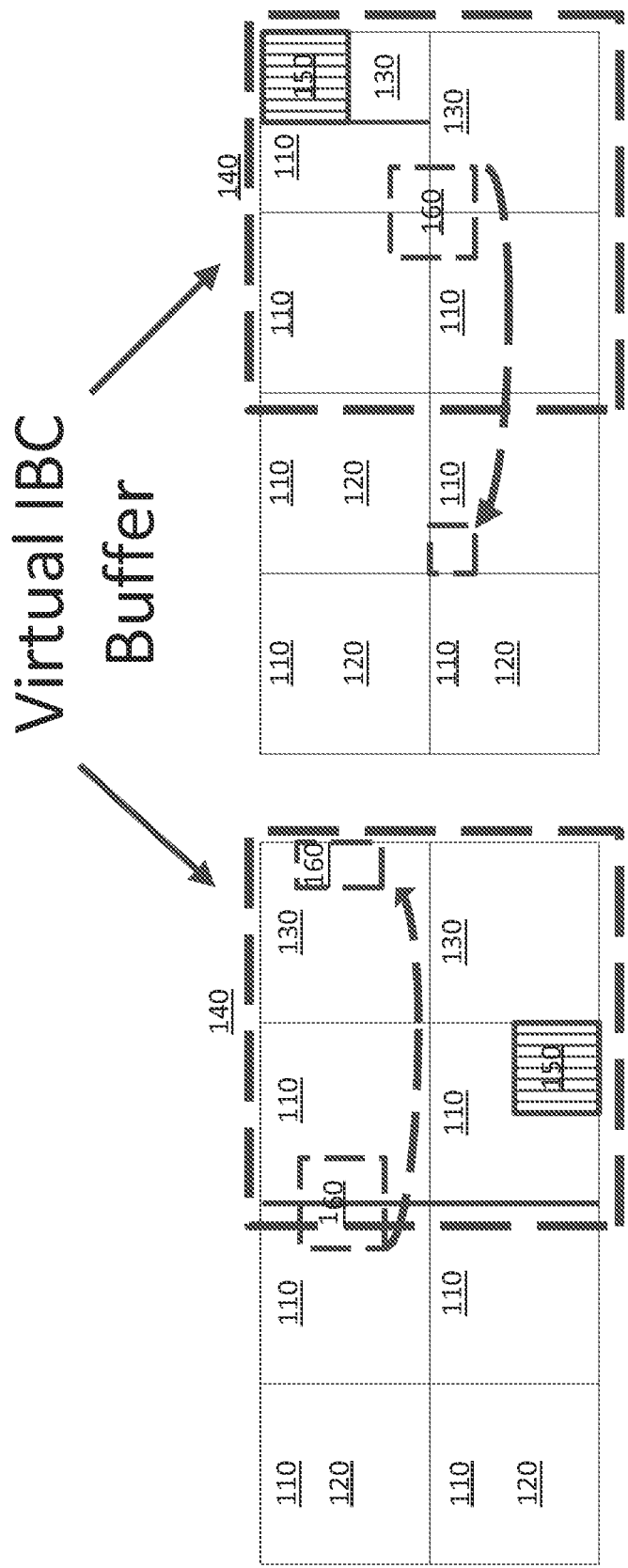
FIG. 1A is a diagram of a reference block with horizontal wrap-around.
FIG. 1B is a diagram of discontinuous samples in a virtual IBC buffer.

In Versatile Video Coding (VVC), also known as H.266, MPEG-I Part 3 and Future Video Coding, the search range of IBC mode is constrained to be within the current coding tree unit (CTU). The effective memory requirement to store reference samples for IBC mode is one CTU size of samples. Considering the existing reference sample memory to store reconstructed samples in a current 64×64 region, three additional 64×64 sized reference sample memory are required.

In light of the foregoing, the embodiments of the present disclosure extend the effective search range of the IBC mode to some part of the left CTU while the total memory requirement for storing reference pixels is substantially maintained (e.g., four 64×64 reference sample memory in total for one CTU size).

According to an embodiment, the total memory size is one (e.g., the largest) CTU size. When the CTU size is different (e.g., smaller) than the largest possible CTU size, in addition to the reconstructed part of the current CTU, the reference samples from the N−1 left CTUs may also be stored in the memory therefore being available for reference. According to an embodiment, N=Memory size/CTU width/CTU width. For example, if the memory size is 128×128 luma samples, and the CTU size is 64×64 luma samples, then N=4 and the reference samples in the three left CTUs relative to the current CTU are fully available for IBC mode reference. The reference samples in the fourth left CTU relative to the current CTU may be used but might not need to be considered as reference areas.

When the reference sample memory is used for IBC reference sample storage, the memory may be partitioned into several regions, each of which has the same size. For example, for a 128×128 CTU, there may be four 64×64 such regions, each of which contains samples of the corresponding regions in either the current CTU or one region of left CTU. As another example, for a 64×64 CTU, there will be four 64×64 such regions, each of which contains samples of the current whole 64×64 CTU or samples of one of the left CTUs in 64×64 as a whole. As yet another example, for a 32×32 CTU, there may be sixteen 32×32 such regions, each of which contains samples of the current whole 32×32 CTU or samples of one of the left CTUs in 32×32 as a whole.

A buffer, referred to herein as an "ibcBuffer," with a size equal to the reference sample memory size is used to store the reference samples for IBC prediction purposes. For a 128×128 CTU, the buffer shape is also 128×128. For a 64×64 CTU, the buffer size is 256×64. For a 32×32 CTU, the buffer size is 512×32. When locations in the ibcBuffer are not allowed to be used for IBC reference, the sample values at those locations in the buffer are marked as "−1" or any value that is not in the valid range of video samples. This buffer is set to be −1 for all entries at the beginning of a CTU row, and for each current vSize×vSize region (e.g., if the CTU size is 64×64 or 128×128, vSize=64, for 32×32 CTU, the vSize=32). A reference block inside the buffer may be allowed to be used for IBC prediction when all sample values in the reference blocks are not the invalid value.

According to an embodiment, a device (e.g., an encoder or decoder) may be configured to, at the beginning of each CTU row, set vSize as min(ctbSize, 64) and wIbcBuf as (128*128/ctbSize). When x0 is equal to 0 and (y0% ctbSize) is equal to 0, for x=x0 . . . x0+wIbcBuf−1 and y=y0 . . . y0+ctbSize−1, ibcBuffer[x % wIbcBuf][y % ctbSize]=−1.

According to an embodiment, a device (e.g., an encoder or decoder) may be configured to, at the beginning of each vSize×vSize region, and when (x0% vSize) is equal to 0 and (y0% vSize) is equal to 0, for x=x0 . . . x0+vSize−1 and y=y0 . . . y0+vSize−1, set ibcBuffer[x % wIbcBuf][y % ctbSize]=−1.

According to an embodiment, a device (e.g., an encoder or decoder) may be configured to, after decoding the block vector mvL, and based on bitstream conformance, set the luma block vector mvL to obey the following constraints: ((yCb+(mvL[1]>>4)) % ctbSize)+cbHeight is less than or equal to ctbSize; and for x=xCb . . . xCb+cbWidth−1 and y=yCb . . . yCb+cbHeight−1, ibcBuf[(x+(mvL>>4)) % wIbcBuf][(y+(mvL>>4)) % ctbSize] shall not be equal to −1.

The first condition is to ensure that the reference block will not be from both the top of the buffer and the bottom of the buffer, in which case the top corner of the reference block is around the bottom part of the ibcBuffer and the bottom corner of the reference block is mapped to the top part of the ibcBuffer (vertical wrap-around).

According to an embodiment, a device (e.g., an encoder or decoder) may be configured to, during the compensation stage, derive the reference samples from the buffer such that the following applies: For x=xCb . . . xCb+Width−1 and y=yCb . . . yCb+Height−1, predSamples[x][y]=ibcBuffer [(x+mv[0]>>4) % wIbcBuf][(y+mv[1]>>4) % ctbSize].

According to an embodiment, a device (e.g., an encoder or decoder) may be configured to, after decoding the current coding unit, the reconstruction samples are put into the reference memory, the ibcBuffer, such that ibcBuffer [(xCurr+i) % wIbcBuf][(yCurr+j) % ctbSize]=recSamples [xCurr+i][yCurr+j] for i=0 . . . nCurrSw−1,j=0 . . . nCurrSh−1.

Reference samples in the picture, when copied into the reference sample memory, may be in part refreshed by some updated samples from the newly coded coding units (CUs). When a block vector points to a specific location inside the reference sample memory, it is possible that different parts of the reference sample block may come from different reference regions in the reconstructed current picture.

FIG. 1A is a diagram of a reference block with horizontal wrap-around, and FIG. 1B is a diagram of discontinuous samples in the virtual ibc buffer. For example, the bottom right part of the reference sample in the memory may not come from the same reference region which the top left part of the reference sample in the memory belongs to. In FIG. 1A and FIG. 1B, an example of such behavior when the CTU size is 128×128 is shown in the right parts, where the current block 150 is in vertical shape, the areas 110 are already reconstructed parts of the current picture, the regions 120 are regions that might not be allowed to be used as reference (e.g., based on memory constraints), the areas 130 are areas that have not yet been reconstructed, the reference block 160 in the memory is the block of the same size as the current block 150.

As shown in FIG. 1B, a fraction of the reference block 160 in the memory (the bottom right part) actually contains samples from the left CTU, which has not yet been updated by the bottom right 64×64 region of the current CTU (not yet coded). It is an allowed case when such a memory is used to store reference samples for IBC.

In FIG. 1A and FIG. 1B, the current block 150 is in vertical stripes and the reference block 160 is the dotted block. In FIG. 1A, although samples in the reference block 160 are continuous in the decoded part of the current picture, when the samples are set in the reference sample memory (the virtual IBC buffer 140), the samples are separated in two parts, one near the left edge and one near the right edge of the buffer 140. In FIG. 1B, samples are continuous in the virtual IBC buffer 140, but are actually discontinuous in the decoded part of the current picture. One corner of the reference block 160 is actually from the left CTU while other parts are from the current CTU.

According to an embodiment, for a current position (xCurr, yCurr) and a neighboring position (xNbY, yNbY), the following clause may be invoked to evaluate if such a neighboring position is available (exist, inside the same prediction region and already reconstructed) to the current position. Below, the array "IsAvailable[cIdx][x][y]" is a picture level variable to record if a sample with component "cIdx" at location (x, y) has been reconstructed or not. If yes, its value may be "TRUE," otherwise it may be "FALSE."

According to an embodiment, the inputs to this process may be: the luma location (xCurr, yCurr) of the top-left sample of the current block relative to the top-left luma sample of the current picture; the luma location (xNbY, yNbY) covered by a neighbouring block relative to the top-left luma sample of the current picture; the variable checkPredModeY specifying whether availability depends on the prediction mode; and/or the variable cIdx specifying the colour component of the current block.

The output of this process may indicate the availability of the neighbouring block covering the location (xNbY, yNbY), denoted as "availableN."

According to an embodiment, the neighbouring block availability "availableN" may be derived as follows: if one or more of the following conditions are true, then "availableN" is set equal to "FALSE": "xNbY" is less than zero; "yNbY" is less than zero; "xNbY" is greater than or equal to "pic_width_in_luma_samples"; "yNbY" is greater than or equal to "pic_height_in_luma_samples"; "IsAvailable[cIdx][yNbY][xNbY]" is equal to "FALSE"; and the neighbouring block is contained in a different brick than the current block, "availableN" is set equal to "FALSE." Otherwise, "availableN" is set equal to "TRUE."

When all of the following conditions are true, then "availableN" may be set equal to "FALSE": "checkPredModeY" is equal to "TRUE"; "availableN" is set equal to "TRUE"; "CuPredMode[0][xNbY][yNbY]" is not equal to "CuPredMode[0][xCurr][yCurr]." Accordingly, there may be a need to design constraints such that the negative behavior mentioned elsewhere herein might not happen.

The embodiments herein may be used separately or combined in any order. Further, each of the methods (or embodiments), encoder, and decoder may be implemented by processing circuitry (e.g., one or more processors or one or more integrated circuits). In an example, the one or more processors execute a program that is stored in a non-transitory computer-readable medium. In the following, the term block may be interpreted as a prediction block, a coding block, or a coding unit, i.e. CU.

According to an embodiment, a "wrap-around operation" is defined as some samples in the reference block coming from one edge of the reference sample memory (virtual IBC buffer) while some other samples in the same reference block come from the other opposite edge of the reference sample memory (e.g., the case shown in FIG. 1A). According to an embodiment, It is horizontal wrap-around in the virtual IBC buffer is disallowed (e.g., prevented).

In addition, the samples in the reference block may be prevented from coming from different CTUs in the current picture, when CTU size is equal to 128×128, where the CTU is divided into several regions to deal with reference sample storage. When CTU size is smaller than 128×128, this constraint may not need to apply.

In an embodiment, when the samples of a reference block come from the same CTU, there may be two cases. In a first case, when all reference samples are from the current CTU, then all the samples in the current picture coordinates should be already reconstructed; in a second case, when all reference samples are from the left CTU, then all such samples in the virtual buffer, if mapped in to picture coordinates, should not be reconstructed (otherwise the location in the buffer will be replaced by the samples from the current CTU).

According to an embodiment, a device may derive the top-left location inside the reference block (xRefTL, yRefTL) in the virtual buffer (IbcVirBuf) as follows:

$$(x\text{Ref}TL, y\text{Ref}TL) = (((xCb+(bvL[0]>>4))\&(wIbcBuf-1)), ((yCb+(bvL[1]>>4))\&(CtbSizeY-1))) \quad \text{(Eq. 1)}$$

According to an embodiment, the device may derive the location (xCtb, yCtb) of the top-left sample of the current coding tree block relative to the top-left sample of the current picture as follows:

$$(xCtb, yCtb) = ((xCb/CtbSizeY)*CtbSizeY, (yCb/CtbSizeY)*CtbSizeY) \quad \text{(Eq. 2)}$$

According to an embodiment, and to comply with bistream conformance, the device may set the luma block vector bvL to obey the following constraints: "CtbSizeY" is greater than or equal to "yRefTL+cbHeight"; "wIbcBuf" is greater than or equal to "xRefTL+cbWidth"; IbcVirBuf[0][(x+(bvL[0]>>4)) & (wIbcBuf−1)][(y+(bvL>>4)) & (CtbSizeY−1)] shall not be equal to −1 for x=xCb . . . xCb+cbWidth−1 and y=yCb . . . yCb+cbHeight−1; and when "CtbSizeY" is equal to 128, "IsAvailable[0][xCtb+xRefTL][yCtb+yRefTL] and IsAvailable[0][xCtb+xRefTL+cbWidth−1][yCtb+yRefTL+cbHeight−1] shall be both equal to "TRUE" or both equal to "FALSE."

In light of the foregoing, the undesirable cases in FIG. 1A and FIG. 1B might not happen.

In the above methods, the modulo operation "x % y" to get the address inside the reference sample memory may be replaced by the "bit wise AND" operation, such as, "x & (y−1)". For example, ((xCb+mvL[0]>>4)) % vSize) can be replaced by ((xCb+(mvL[0]>>4)) & (vSize−1)).

FIG. 2 illustrates a simplified block diagram of a communication system (200) according to an embodiment of the present disclosure. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of the present disclosure are not so limited. Embodiments of the present disclosure find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
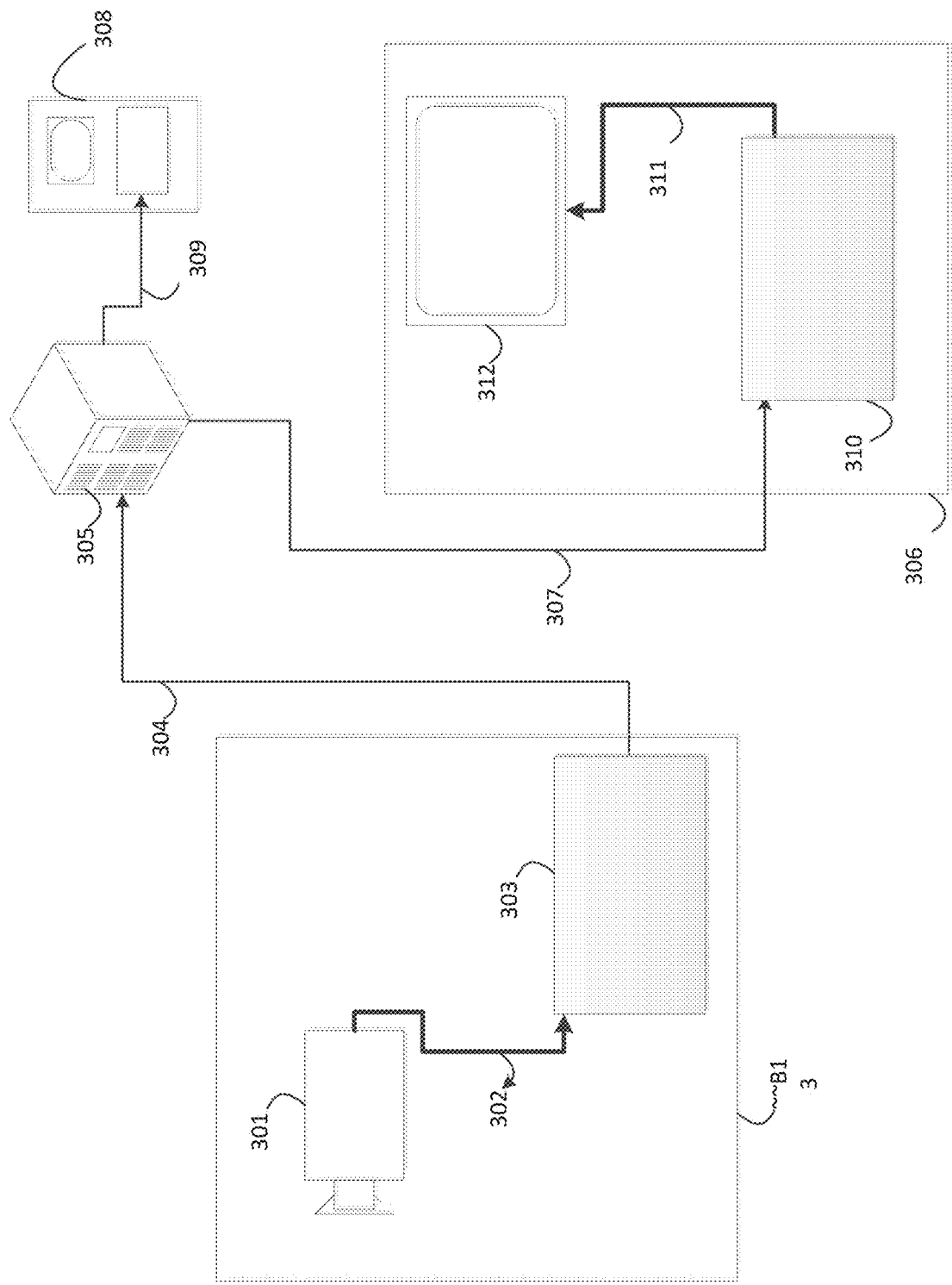
FIG. 3 is a diagram of a video encoder and decoder in a streaming environment according to an embodiment of the present disclosure.

FIG. 3 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera 301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 4:
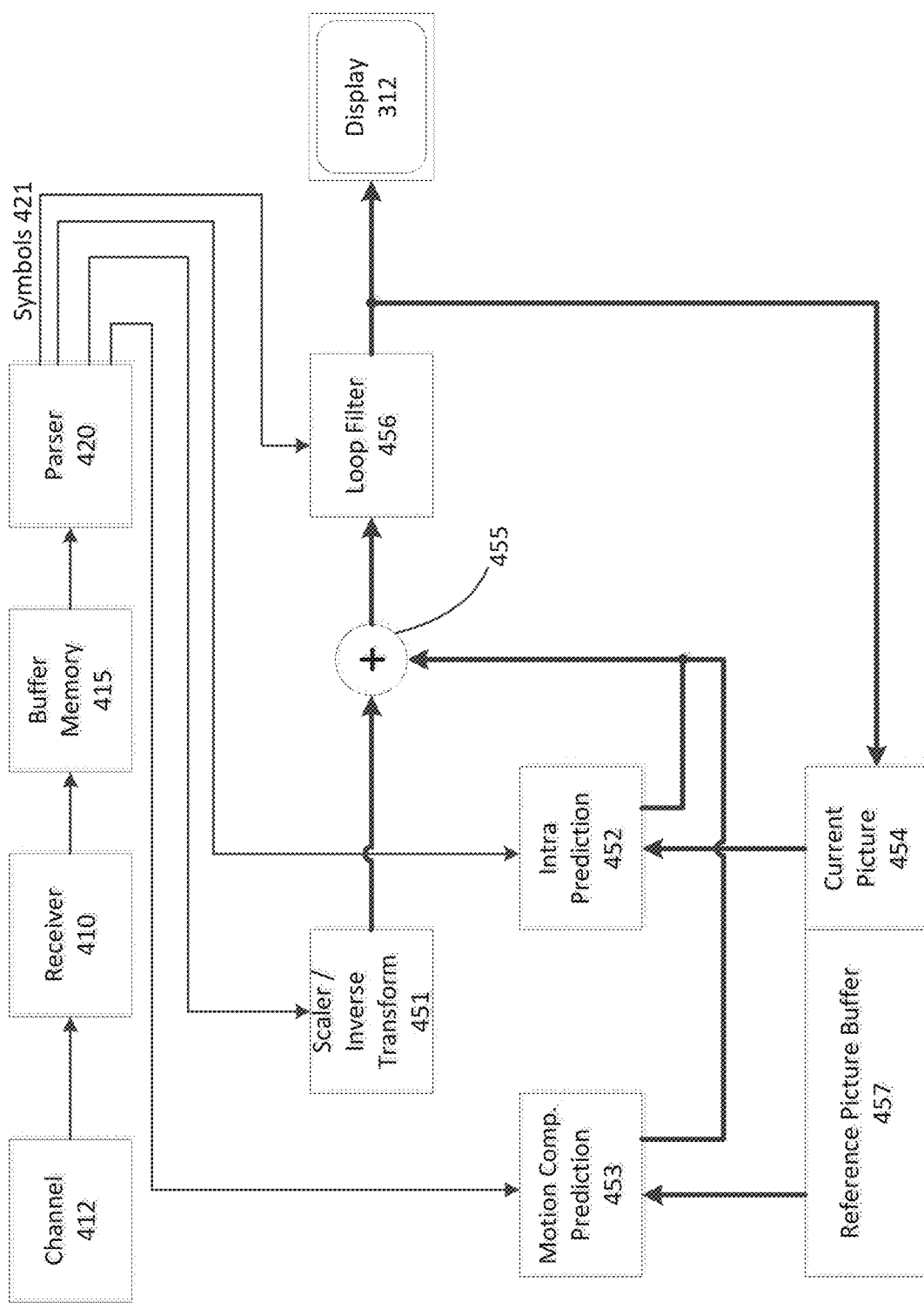
FIG. 4 is a functional block diagram of a video decoder according to an embodiment of the present disclosure.

FIG. 4 may be a functional block diagram of a video decoder (310) according to an embodiment of the present invention.

A receiver (410) may receive one or more codec video sequences to be decoded by the decoder (310); in the same or another embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction Unit (452), or a loop filter (456).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (621) from the parser (420). It can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (454). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video bitstream and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (656) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
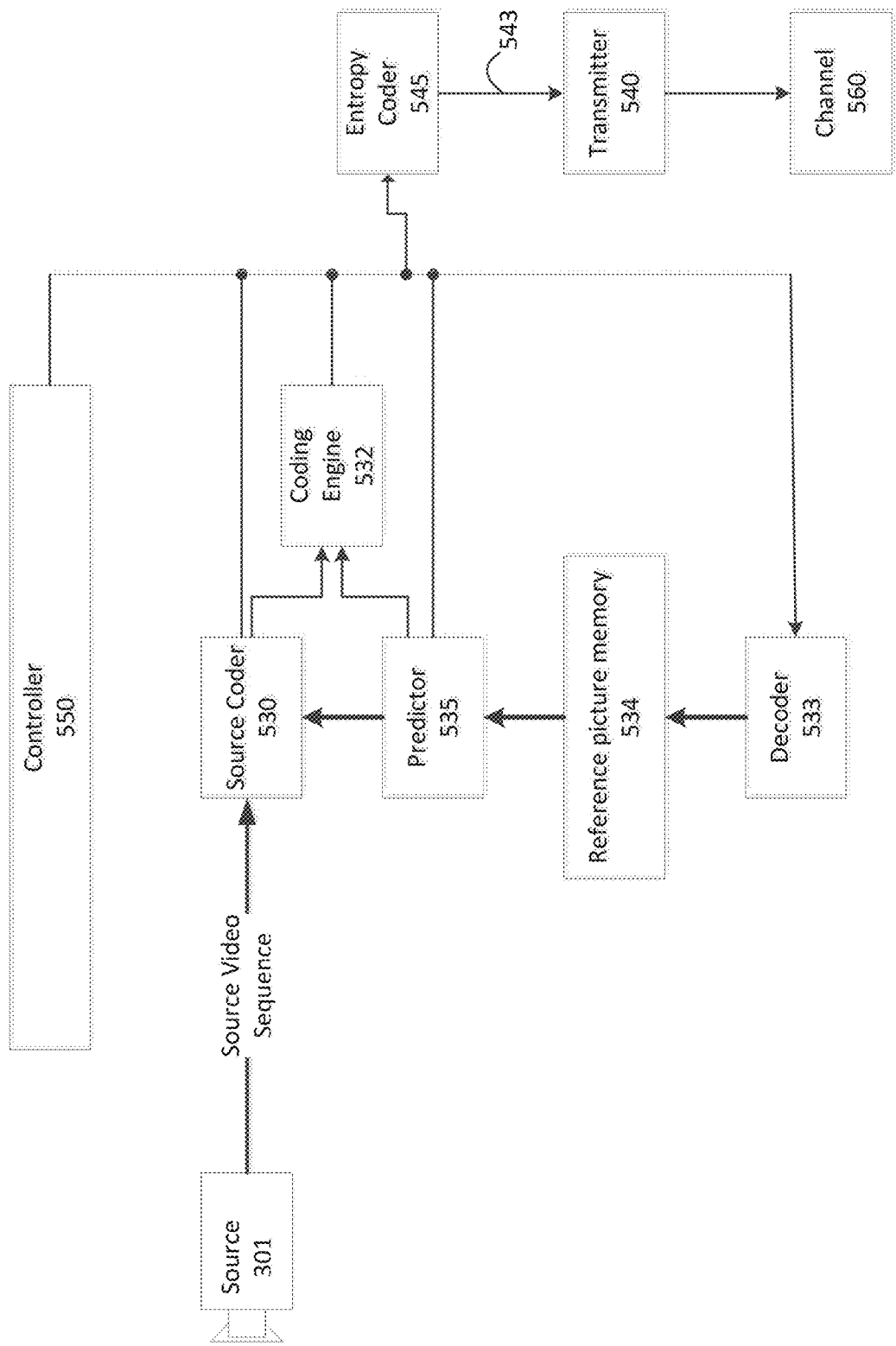
FIG. 5 is a functional block diagram of a video encoder according to an embodiment of the present disclosure.

FIG. 5 may be a functional block diagram of a video encoder (303) according to an embodiment of the present disclosure.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (303) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 5, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device which would store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 6 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
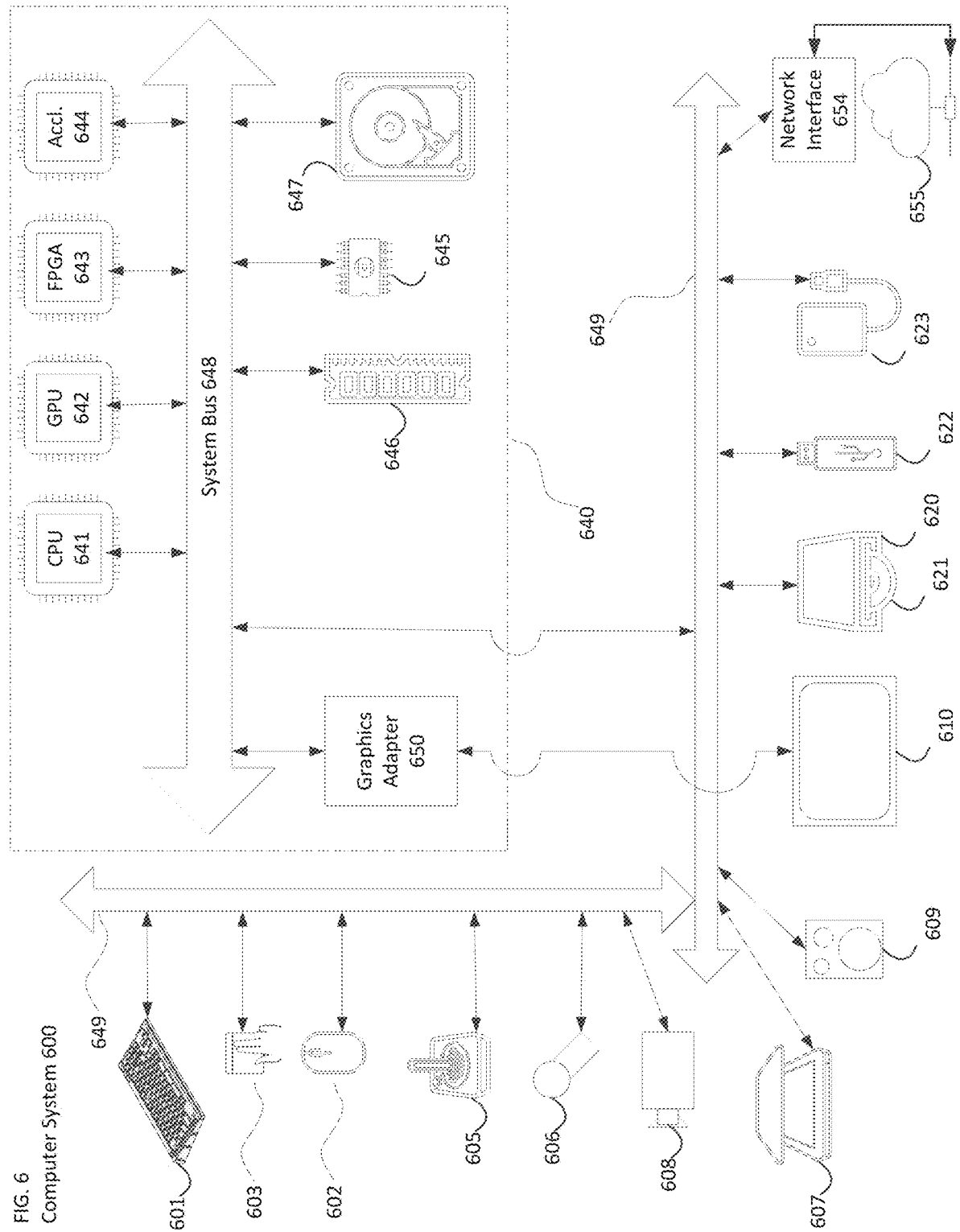
FIG. 6 is a diagram of a computer system according to an embodiment of the present disclosure.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove 1204, joystick 605, microphone 606, scanner 607, camera 608.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data-glove 1204, or joystick 605, but there can also be tactile feedback devices that do not serve as input devices), audio output devices (such as: speakers 609, headphones (not depicted)), visual output devices (such as screens 610 to include cathode ray tube (CRT) screens, liquid-crystal display (LCD) screens, plasma screens, organic light-emitting diode (OLED) screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 600 can also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example universal serial bus (USB) ports of the computer system 600; others are commonly integrated into the core of the computer system 600 by attachment to a system bus as described below (for example Ethernet interface into a PC computer system or cellular network interface into a smartphone computer system). Using any of these networks, computer system 600 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 640 of the computer system 600.

The core 640 can include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory (RAM) 646, internal mass storage such as internal non-user accessible hard drives, solid-state drives (SSDs), and the like 647, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 649. Architectures for a peripheral bus include peripheral component interconnect (PCI), USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieve to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not byway of limitation, the computer system having architecture 600, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 7:
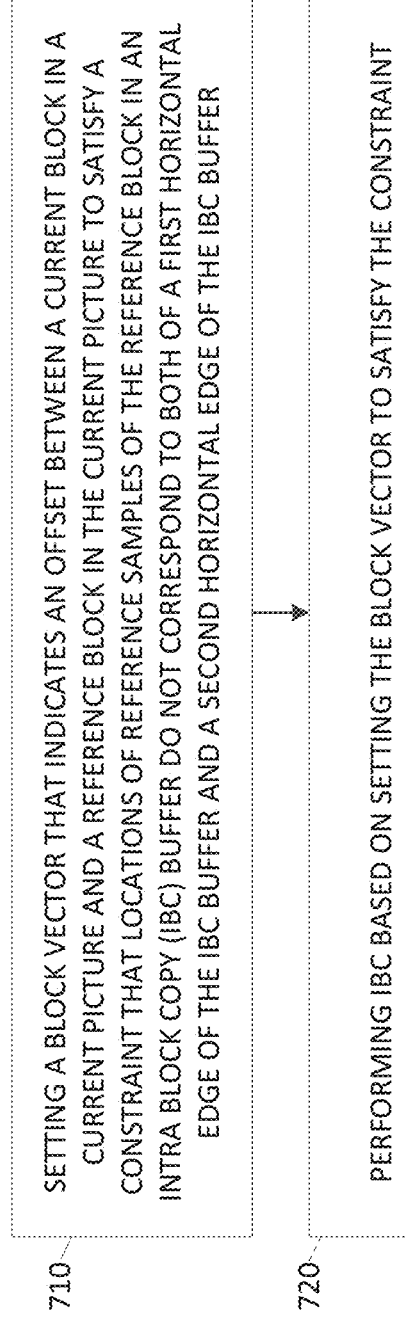
FIG. 7 is a flowchart of an example process for setting a block vector for intra block copy (IBC).

FIG. 7 is a flowchart of an example process for setting a block vector for intra block copy (IBC). As shown in FIG. 7, a process may include setting the block vector that indicates an offset between a current block in a current picture and a reference block in the current picture to satisfy a constraint that locations of reference samples of the reference block stored in an IBC buffer do not correspond to both of a first horizontal edge of the IBC buffer and a second horizontal edge of the IBC buffer (operation 710).

According to an embodiment, the process may include setting the block vector to satisfy another constraint that the reference samples of the reference block do not correspond to different coding tree units (CTUs) in the current picture.

According to an embodiment, the process may include determining whether a coding tree unit (CTU) size is less than 128×128; and selectively setting the block vector to satisfy another constraint that the reference samples of the reference block do not correspond to different coding tree units (CTUs) in the current picture, based on whether the CTU size is less than 128×128.

According to an embodiment, the process may include setting the block vector to satisfy another constraint that all of the reference samples of the reference block are already reconstructed in the current picture, based on all of the reference samples of the reference block being from a same coding tree unit (CTU).

According to an embodiment, the process may include setting the block vector to satisfy another constraint that all of the reference samples of the reference block are not already reconstructed in the current picture, based on all of the reference samples of the reference block being from a same coding tree unit (CTU) that is left of a current CTU.

According to an embodiment, the process may include storing the reference samples in the IBC buffer.

According to an embodiment, the IBC buffer has a same size as a current coding tree unit (CTU).

As further shown in FIG. 7, the process may include performing IBC based on setting the block vector to satisfy the constraint (operation 720).

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for setting a block vector for intra block copy (IBC), the method comprising:
   setting the block vector that indicates an offset between a current block in a current picture and a reference block in the current picture to satisfy a constraint that locations of reference samples of the reference block stored in an IBC buffer do not correspond to both of a first horizontal edge of the IBC buffer and a second horizontal edge of the IBC buffer;
   performing IBC based on setting the block vector to satisfy the constraint; and
   storing the reference samples in the IBC buffer.

2. The method of claim 1, further comprising:
   setting the block vector to satisfy another constraint that the reference samples of the reference block do not correspond to different coding tree units (CTUs) in the current picture.

3. The method of claim 1, further comprising:
   determining whether a coding tree unit (CTU) size is less than 128×128; and
   selectively setting the block vector to satisfy another constraint that the reference samples of the reference block do not correspond to different coding tree units (CTUs) in the current picture, based on whether the CTU size is less than 128×128.

4. The method of claim 1, further comprising:
   setting the block vector to satisfy another constraint that all of the reference samples of the reference block are already reconstructed in the current picture, based on all of the reference samples of the reference block being from a same coding tree unit (CTU).

5. The method of claim 1, further comprising:
   setting the block vector to satisfy another constraint that all of the reference samples of the reference block are not already reconstructed in the current picture, based on all of the reference samples of the reference block being from a same coding tree unit (CTU) that is left of a current CTU.

6. The method of claim 1, wherein the IBC buffer has a same size as a current coding tree unit (CTU).

7. A device for setting a block vector for intra block copy (IBC), the device comprising:
at least one memory configured to store program code; and
at least one processor configured to read the program code and operate as instructed by the program code, the program code including:
setting code configured to cause the at least one processor to set the block vector that indicates an offset between a current block in a current picture and a reference block in the current picture to satisfy a constraint that locations of reference samples of the reference block stored in an IBC buffer do not correspond to both of a first horizontal edge of the IBC buffer and a second horizontal edge of the IBC buffer;
performing code configured to cause the at least one processor to perform IBC based on setting the block vector to satisfy the constraint; and
storing code configured to cause the at least one processor to store the reference samples in the IBC buffer.

8. The device of claim 7, wherein the setting code is further configured to cause the at least one processor to set the block vector to satisfy another constraint that the reference samples of the reference block do not correspond to different coding tree units (CTUs) in the current picture.

9. The device of claim 7, wherein the setting code is further configured to cause the at least one processor to selectively set the block vector to satisfy another constraint that the reference samples of the reference block do not correspond to different coding tree units (CTUs) in the current picture, based on whether the CTU size is less than 128×128.

10. The device of claim 7, wherein the setting code is further configured to cause the at least one processor to set the block vector to satisfy another constraint that all of the reference samples of the reference block are already reconstructed in the current picture, based on all of the reference samples of the reference block being from a same coding tree unit (CTU).

11. The device of claim 7, wherein the setting code is further configured to cause the at least one processor to set the block vector to satisfy another constraint that all of the reference samples of the reference block are not already reconstructed in the current picture, based on all of the reference samples of the reference block being from a same coding tree unit (CTU) that is left of a current CTU.

12. The device of claim 7, wherein the IBC buffer has a same size as a current coding tree unit (CTU).

13. A non-transitory computer-readable medium storing instructions, the instructions comprising: one or more instructions that, when executed by one or more processors of a device, cause the one or more processors to:
set a block vector that indicates an offset between a current block in a current picture and a reference block in the current picture to satisfy a constraint that locations of reference samples of the reference block stored in an IBC buffer do not correspond to both of a first horizontal edge of the IBC buffer and a second horizontal edge of the IBC buffer;
perform IBC based on setting the block vector to satisfy the constraint; and
store the reference samples in the IBC buffer.

14. The non-transitory computer-readable medium of claim 13, wherein the one or more instructions further cause the one or more processors to:
set the block vector to satisfy another constraint that the reference samples of the reference block do not correspond to different coding tree units (CTUs) in the current picture.

15. The non-transitory computer-readable medium of claim 13, wherein the one or more instructions further cause the one or more processors to:
determine whether a coding tree unit (CTU) size is less than 128×128; and
selectively set the block vector to satisfy another constraint that the reference samples of the reference block do not correspond to different coding tree units (CTUs) in the current picture, based on whether the CTU size is less than 128×128.

16. The non-transitory computer-readable medium of claim 13, wherein the one or more instructions further cause the one or more processors to:
set the block vector to satisfy another constraint that all of the reference samples of the reference block are already reconstructed in the current picture, based on all of the reference samples of the reference block being from a same coding tree unit (CTU).

17. The non-transitory computer-readable medium of claim 13, wherein the one or more instructions further cause the one or more processors to:
set the block vector to satisfy another constraint that all of the reference samples of the reference block are not already reconstructed in the current picture, based on all of the reference samples of the reference block being from a same coding tree unit (CTU) that is left of a current CTU.

* * * * *